United States Patent
Liu et al.

(10) Patent No.: US 6,796,137 B2
(45) Date of Patent: Sep. 28, 2004

(54) AIR CONDITIONING SYSTEM COMPRISING AN ELECTRONIC CONTROL DEVICE

(75) Inventors: Jin Ming Liu, Conflans Saint Honorine (FR); Emmanuel Mace, Asniere S/Seine (FR); Mohamed Ben Yahia, Paris (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 10/667,924

(22) Filed: Sep. 22, 2003

(65) Prior Publication Data

US 2004/0060310 A1 Apr. 1, 2004

(30) Foreign Application Priority Data

Sep. 27, 2002 (FR) .............................................. 02 11988

(51) Int. Cl.[7] .............................. F25B 1/00; F25B 49/00
(52) U.S. Cl. ........................ 62/228.3; 62/129; 62/208; 62/228.4
(58) Field of Search ............................ 62/228.3, 228.4, 62/126, 129, 230, 208, 209

(56) References Cited

U.S. PATENT DOCUMENTS 4,510,576 A * 4/1985 MacArthur et al. ......... 702/182
4,653,288 A * 3/1987 Sayo et al. .................... 62/210
6,701,725 B2 * 3/2004 Rossi et al. .................... 62/125
2004/0003603 A1 * 1/2004 Saeki et al. .................... 62/133

FOREIGN PATENT DOCUMENTS

| EP | 0786632 A | 7/1997 |
|---|---|---|
| EP | 1127721 A | 8/2001 |
| EP | 1134516 A | 9/2001 |
| FR | 2 711731 | 5/1995 |
| FR | 2 797036 | 2/2001 |

* cited by examiner

*Primary Examiner*—Marc Norman
(74) *Attorney, Agent, or Firm*—Ronald Courtney (57) ABSTRACT

The invention proposes an air conditioning system for motor vehicles which is fitted with an injection computer and an electronic control device. The system comprises a first measuring member suitable for supplying a value relating to the pressure of the fluid at a first point in the air conditioning circuit which is situated between the outlet of the expansion member and the outlet of the evaporator, and a second measuring member suitable for supplying a value relating to the pressure of the fluid at a second point in the air conditioning circuit which is situated at the inlet to the compressor. The electronic control device makes use of the solution of an equation which relates the mass flow rate of the refrigerant fluid to the difference in pressure between the first point and the second point in order to calculate an estimate of a magnitude relating to the refrigerant fluid.

19 Claims, 4 Drawing Sheets

AIR CONDITIONING SYSTEM COMPRISING AN ELECTRONIC CONTROL DEVICE

FIELD OF THE INVENTION

The invention relates to air-conditioning circuits for motor vehicles.

BACKGROUND OF THE INVENTION

In conventional motor vehicles, the compressor in the air conditioning circuit is driven by the engine and thus consumes some of the power from the engine. Although the power drawn by the compressor, when it is running, is not great, it does have an effect on the efficiency of the engine. The fact is that the power actually drawn by the compressor reduces the efficiency of the engine, thus increasing fuel consumption and the pollution generated by the vehicle's exhaust gases.

To optimise the efficiency of the engine, one solution is to estimate the instantaneous power actually drawn by the compressor. With a knowledge of this information, it is in fact possible for the injection parameters of the engine to be adjusted to the actual requirements that exist. Without a knowledge of this information, the injection computer selects, by default, the injection parameters which correspond to the maximum figure for power drawn, a level which is rarely reached in practice.

This drawback may relate to internally controlled mechanical compressors which operate via a clutch inserted between the engine and the compressor. In the regulated mode, internally controlled compressors adjust their volumetric displacement by following a linear law which relates the level of the pressure at the input to the compressor, termed the low pressure, to the level at the delivery of the compressor, termed the high pressure. However, it does happen that the power actually drawn by the compressor is less than its nominal power.

Compressors of this kind draw a power which depends on the operating conditions and which therefore cannot be reduced even if the power actually drawn by the compressor is known. Conversely, it is possible for the operation of the air conditioning to be regulated by disconnecting the compressor when the power level is unacceptable.

This drawback is even more of a nuisance with externally controlled compressors, the use of which is becoming more widespread.

The fact is that in externally controlled mechanical compressors the power actually drawn by the compressor is often less than its nominal power. Consequently, the injection to the engine has to compensate for the difference between the nominal mechanical power and the mechanical power actually drawn, which reduces the efficiency of the engine.

In known embodiments, the instantaneous power drawn by the compressor is estimated from a map of the most frequently used states of operation. This map includes reference states, each reference state being associated with a value for the power drawn by the compressor which was provided by prior tests. The power drawn by the compressor is estimated by comparing the operating state of the air conditioning circuit with a reference state which forms part of the map. Methods based on mapping of this kind require long development times and are based on empirical data. They have the drawback of not taking into account all the possible circumstances of operation and hence of giving results which are only approximate.

In other embodiments, the instantaneous power drawn by the compressor is calculated from an estimate of the flow rate of refrigerant fluid. French patent application No. 01 16568 proposes estimating the flow rate of refrigerant fluid in the air conditioning circuit from an item of information relating to the speed of the vehicle and an item of information relating to the voltage from the motorised fan unit. However, these two items of information are not available on all vehicles.

It is an object of the invention to propose an air conditioning system which enables use to be made of an equation which relates the flow rate of refrigerant fluid to parameters relating to the refrigerant fluid which are available in any vehicle, to give an estimate of the flow rate of refrigerant fluid and in particular to enable the power drawn by the compressor to be calculated.

In more general terms, it is an object of the invention to propose an air conditioning system which enables use to be made of such an equation to give an estimate of a magnitude relating to the refrigerant fluid.

SUMMARY OF THE INVENTION

To this end, the invention proposes an air conditioning system for motor vehicles which is fitted with an injection computer and with a refrigerant fluid circuit comprising a compressor, a cooling member, an expansion member and an evaporator. The system also comprises an electronic control device intended to interact with the refrigerant fluid circuit and the injection computer. Advantageously, the system comprises:

a first measuring member suitable for supplying a value relating to the pressure of the fluid at a first point in the air conditioning circuit, termed the first pressure, said first point being situated between the outlet of the expansion member and the outlet of the evaporator, a second measuring member suitable for supplying a value relating to the pressure of the fluid at a second point in the air conditioning circuit, termed the second pressure, the second point being situated at the inlet to the compressor, while the electronic control device is able to make use of the solution of an equation which relates the mass flow rate of the refrigerant fluid to the difference in pressure between the first point and the second point in order to calculate an estimate of a magnitude relating to the refrigerant fluid.

In a first embodiment of the invention, the magnitude relating to the refrigerant fluid is the mass flow rate of refrigerant fluid, while the electronic control device is able to solve the said equation from the value of the first pressure and the value of the second pressure.

In a second embodiment of the invention, the magnitude relating to the refrigerant fluid is the second pressure and the electronic control device is able to solve the said equation from the value of the mass flow rate of the fluid and the value of the first pressure.

In this second embodiment of the invention, the cooling member is a condenser and the system comprises measuring members suitable for supplying a value relating to the temperature of the flow of outside air at the inlet to the condenser and a value relating to the pressure of the fluid at the delivery of the compressor, termed the high pressure, while the electronic control device is able to use the values supplied by said measuring members in order to make use of the solution of an equation which relates the mass flow rate of the refrigerant fluid to the temperature of the flow of outside air at the inlet to the condenser and to the high pressure to calculate an estimate of the instantaneous value of the mass flow rate of the refrigerant fluid.

In a third embodiment of the invention, the compressor is of variable displacement and the magnitude relating to the refrigerant fluid is the minimum value of the pressure of the fluid corresponding to the maximum displacement of the compressor, the electronic control device being able to solve the said equation from the value of the first pressure and the value of the speed of rotation of the compressor.

The value of the speed of rotation of the compressor may be supplied to the electronic control device by the injection computer.

In a particular embodiment, the system comprises a compressor which is fitted with a control valve and the second measuring member is a sensor suitable for supplying the instantaneous value of current at the control valve, the electronic control device being able to calculate an initial estimate of the second pressure from the value of the current to the control valve of the compressor which is supplied by the second measuring member.

In this embodiment, the electronic control device is able to compare the initial estimate of the second pressure with the minimum value of the second pressure.

The electronic control device is then able to react to the fact that the initial estimate of the second pressure is equal to or less than the minimum value of the second pressure by supplying a final estimate of the second pressure which is substantially equal to the minimum value of the second pressure.

The electronic control device is likewise able to react to the fact that the second pressure is higher than the minimum value of the second pressure by supplying a final estimate of the second pressure which is substantially equal to the initial estimate of the second pressure.

In another embodiment, the second member is a sensor which is positioned at the second point and which is suitable for supplying the instantaneous value of the second pressure directly.

According to another feature of the invention, the first measuring member is a sensor which is positioned at the first point and which is suitable for supplying the instantaneous value of the first pressure.

In a first variant, the first measuring member may be a temperature probe which is positioned in the fins of the evaporator and which is suitable for supplying a measurement of the instantaneous value of the temperature of the air in the evaporator.

In a second variant, the first measuring member may be a temperature probe which is positioned downstream of the evaporator and which is suitable for supplying a measurement of the instantaneous value of the temperature of the air entering the evaporator.

In a third variant, the first measuring member may be a temperature probe which is suitable for supplying the instantaneous value of the temperature of the fluid, the probe being positioned at the first point, in contact with the liquid part of the fluid.

In this third variant, the first point is situated at a location in the air conditioning circuit at which the refrigerant fluid is in a diphase state.

In particular, in the first variant and the third variant, the expansion member may be a thermostatic expander, while the temperature probe is positioned in the zone where fluid is injected into the evaporator.

In these three variants, the electronic control device is able to estimate the value of the first pressure from the value supplied by the temperature probe.

As a supplementary provision, the temperature probe has a time constant equal to or less than 5 seconds.

Other features and advantages of the invention will become apparent from perusal of the detailed description below and from the accompanying drawings, in which:

DESCRIPTION OF THE PREFERRED EMBODIMENTS

Appendix A gives the main mathematical equations used in the system.

In the main, the drawings show items which are definitely present. They may thus not only serve to enable a better understanding to be gained of the description but may also, where appropriate, assist in defining the invention.

Figure 1A:
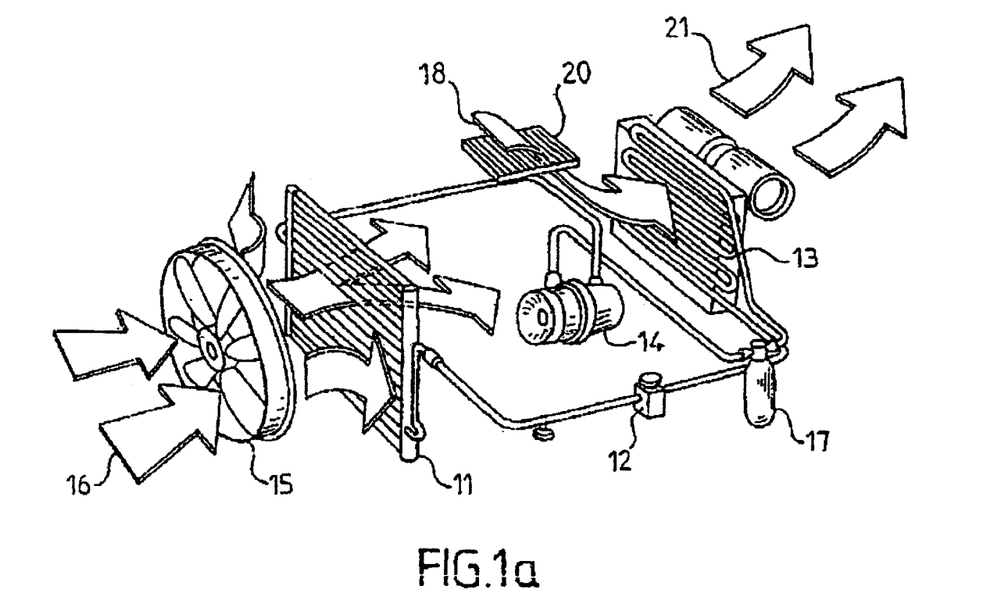
FIG. 1a is a general arrangement view of an air conditioning arrangement installed on board a vehicle.

Reference will first be made to FIG. 1a, which is a general arrangement view of an air conditioning apparatus built into a vehicle. The air conditioning apparatus comprises a closed circuit for refrigerant fluid. The air conditioning apparatus also comprises a compressor 14, a cooling member 11, an expansion member 12 and an evaporator 13, through which the refrigerant fluid flows in the order given. The circuit may also comprise an accumulator 17 which is positioned between the outlet of the evaporator and the input to the compressor to prevent liquid-hammer effects.

The cooling member 11 receives a flow of outside air 16 to dissipate the heat which is collected by the evaporator from the passenger compartment, which flow 16 is set in motion by a motorised fan unit 15 under certain operating conditions.

The evaporator 13 receives a flow of air from a pulser 20 which is fed by a flow of outside air 18, and produces a flow of conditioned air 21 which is directed towards the passenger compartment of the vehicle.

In the example shown in FIG. 1a, the air conditioning circuit has a subcritical refrigerant fluid, such as R134a refrigerant fluid, flowing through it. A fluid of this kind has a critical pressure which is higher that the pressure of the hot source. In air conditioning circuits which employ fluids of this kind, such as that shown in FIG. 1, the cooling member 11 is a condenser. The expansion member may for example be a calibrated orifice or a thermostatic expander.

However, the invention is not limited to air conditioning circuits which operate with subcritical refrigerant fluids and are fitted with a cooling member of the condenser type.

Figure 1B:
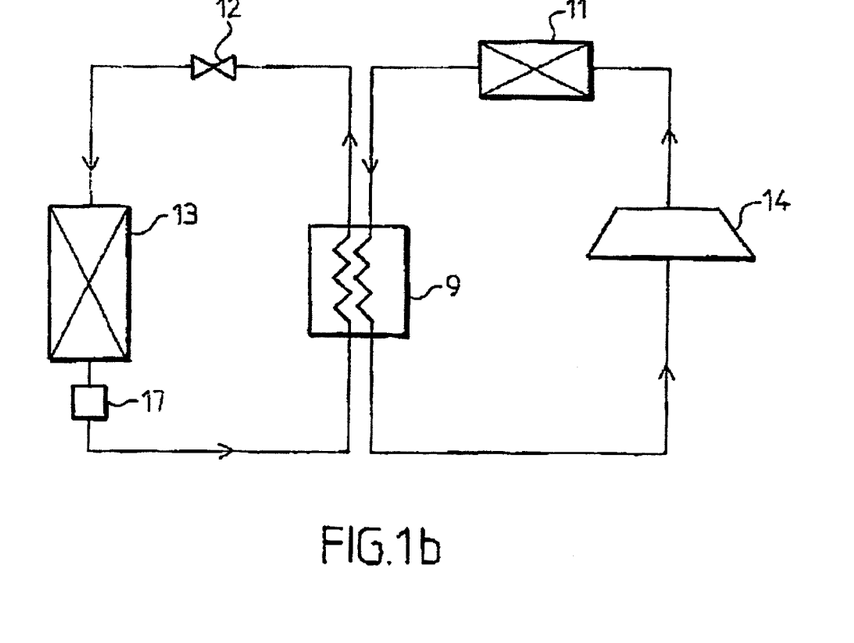
FIG. 1b is a diagram of an air conditioning circuit for a supercritical refrigerant fluid.

In particular, the air conditioning circuit may have a supercritical refrigerant fluid, such as $CO_2$ refrigerant fluid, flowing through it. In supercritical fluids, the high pressure at high temperature is higher than the critical pressure of the fluid. FIG. 1b shows an air conditioning circuit that operates with the supercritical fluid CO2. In such a circuit, the cooling member 11 is an external cooler ("gas cooler"). The expansion member 12 may be an electrical valve or a mechanical valve for example. The circuit comprises an evaporator 13, an accumulator 17 and a compressor 14 operating as described above. The circuit also comprises an internal heat exchanger 9.

In air conditioning circuits employing a supercritical fluid, the cooling of the fluid after compression does not entail a change of phase. The fluid only changes to the liquid state in the course of expansion. The internal heat exchanger 9 enables the fluid leaving the external cooler 11 to be very severely cooled, or indeed liquefied.

In what follows, the description will be given, by way of non-limiting example, by reference to the air conditioning circuit of FIG. 1 which operates with a subcritical fluid such as R134a.

Figure 2:
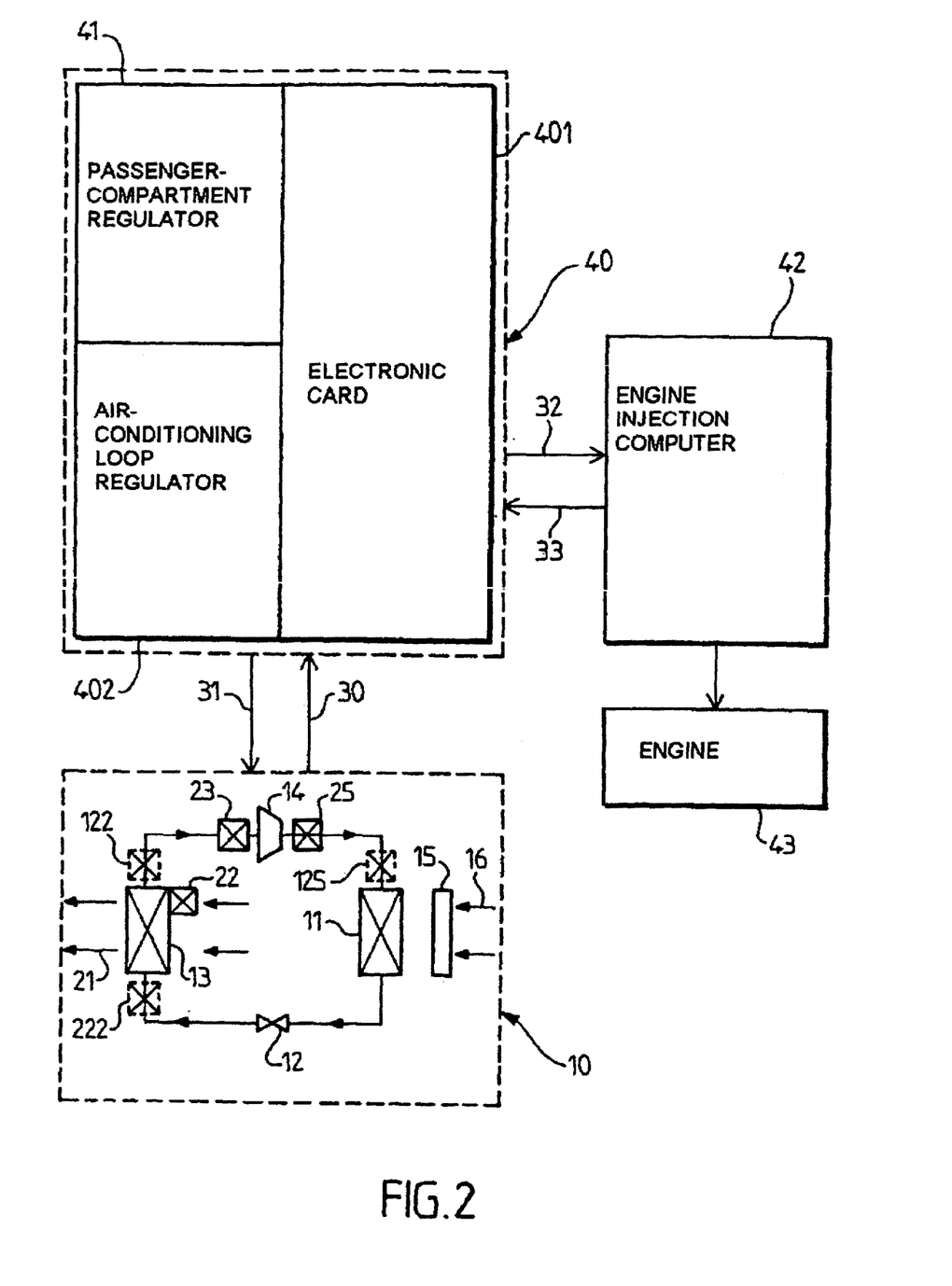
FIG. 2 is a diagram of a motor vehicle system fitted with the control device according to the invention.

FIG. 2 is a diagram representing the system according to the invention installed in a motor vehicle. The motor vehicle is driven by an engine 43 which is controlled by an injection computer 43. The computer receives information from various sensors and interprets it to allow the parameters to be adjusted.

The injection computer 42 is suitable for supplying items of information on conditions inside or outside the vehicle (information supplied by a solar sensor, number of occupants, etc.). In particular, it supplies items of information 33 on instantaneous values relating to the operation of the vehicle, and particularly on the speed of rotation N of the compressor.

The vehicle is also equipped with the air conditioning apparatus 10 described above, which is shown diagrammatically in FIG. 2. The system is also fitted with an air conditioning computer 40, which comprises a passenger-compartment regulator 41 and an air-conditioning loop regulator 402. The passenger-compartment regulator 41 is intended to set the temperature set point $T_{ae}$ for the outside air blown in at the input to the evaporator 11.

The injection computer 42 for the engine may act on the air conditioning apparatus by means of the air-conditioning loop regulator 402 to cause the air conditioning apparatus to start or stop as dictated by conditions relating to the operation of the engine or outside commands. The injection calculator 42 may for example stop the air conditioning apparatus from being started when the engine is subject to a heavy load.

The Applicant proposes to optimise the operation of the air conditioning circuit in a system of this kind, by making using of an equation which relates the flow rate of fluid in the air conditioning circuit to a difference in pressure between two points situated on the low-pressure line. Referring to FIG. 2, the low-pressure line corresponds to that part of the air conditioning circuit which is situated between the outlet of the expander 12 and the input to the compressor 14.

For this, the passenger-compartment regulator 41, the injection computer 42 for the engine and the air conditioning apparatus 10 are connected to an electronic control device, such as for example an electronic card 401 for exchanging information.

The electronic card 401 is programmed to solve the equations which enable the difference in pressure on the low-pressure line to be estimated from measurements supplied by the system, and to solve the equation which relates this difference in pressure to the flow rate of the refrigerant fluid. It may also be programmed to enable the solution of an equation which relates the power drawn by the compressor to the flow rate of refrigerant fluid to be made use of to supply an estimate of the power drawn by the compressor. It is arranged to transmit the information which is the result of these estimates to the injector computer 42, via a connection 32.

The electronic card 401 may be considered an integral part of the vehicle's air conditioning computer 40.

It is connected to the air-conditioning loop regulator 402, whose function is in particular to adjust the amount of heat collected from the passenger compartment, termed the cooling load, to allow the set point for the temperature of the air blown in at the outlet of the evaporator or the set point for the passenger compartment probe to be reached.

According to a feature of the invention, the electronic card 401 may receive information coming from sensors installed on the air conditioning apparatus via a connection 30. Sensors of this kind are installed to determine the instantaneous value of the pressure $P_1$ of the refrigerant fluid at a first point B1 which is situated between the outlet of the expansion member and the outlet of the evaporator, and of the pressure $P_2$ of the refrigerant fluid at a second point B2 which is situated at the inlet to the compressor. The first pressure $P_1$ will be referred to below as the "origin pressure" and the second pressure $P_2$ as the "suction pressure".

In general terms, the electronic card 401 is able to make use of the equation which relates the flow rate of refrigerant fluid to the difference in pressure between two points on the low-pressure line to determine a magnitude relating to the refrigerant fluid.

In a first embodiment according to the invention, this magnitude relating to the refrigerant fluid is the flow rate of the refrigerant fluid. This value is particularly useful for estimating the power consumed by the air conditioning circuit and for adjusting this consumption.

Figure 3:
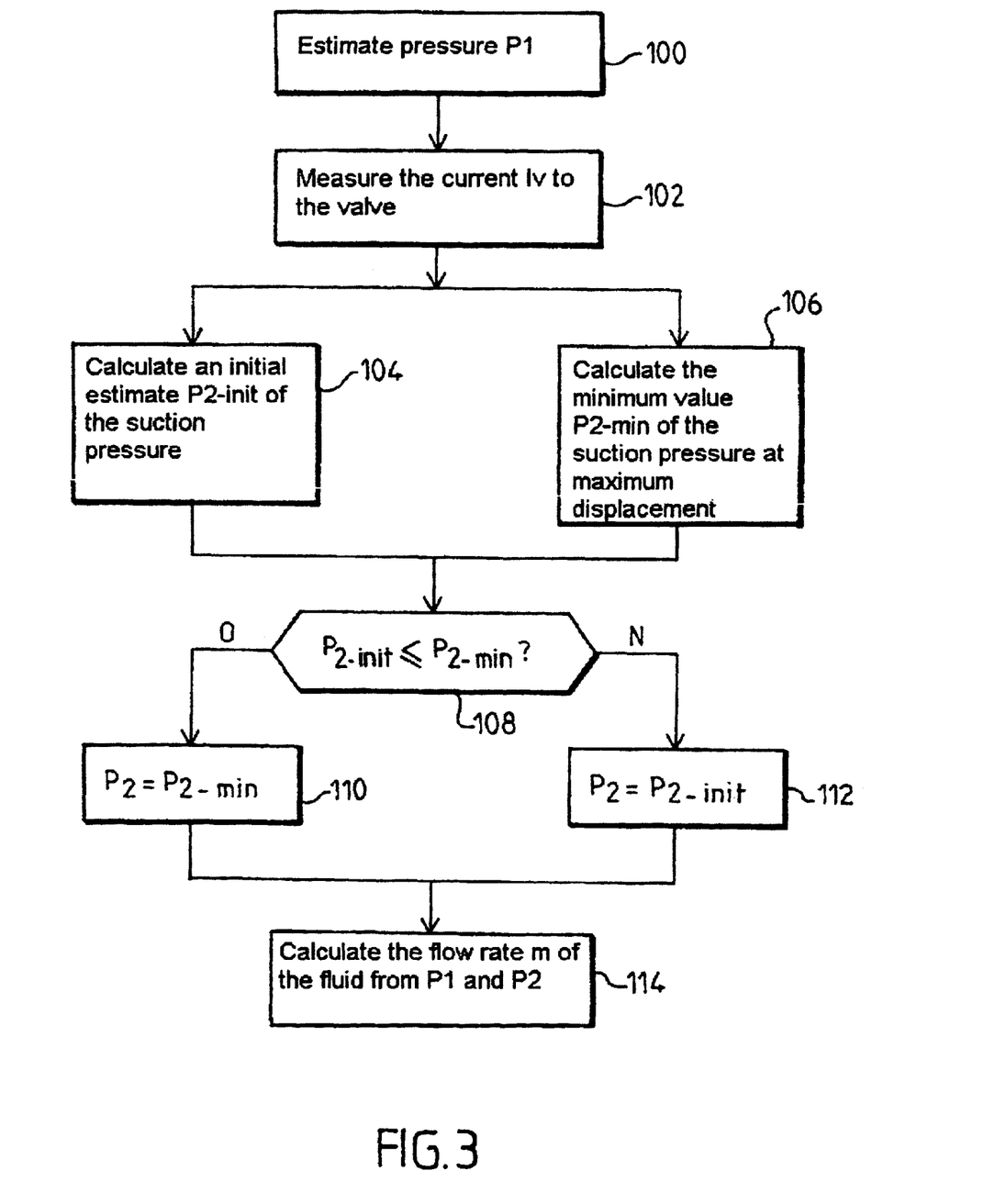
FIG. 3 is a flow chart illustrating the various steps implemented, in accordance with the invention, by a system fitted with a variable displacement compressor.

FIG. 3 is a flow chart representing the steps performed by the system to supply this estimate of the flow rate of the refrigerant fluid for a variable displacement compressor.

In step 100, the system supplies to the electronic card the value of the origin pressure $P_1$ at point B1.

According to one aspect of the invention, the air conditioning circuit comprises a first measuring member suitable for supplying a value relating to the origin pressure $P_1$.

The first member may be a temperature probe which supplies the instantaneous value of the temperature $T_{air}$ of the air in the evaporator. This probe may be positioned in the fins of the evaporator.

As a variant, referring to FIG. 2, the first member may be a temperature probe 22 which is positioned downstream of the evaporator and which supplies the instantaneous value of the temperature $T_{air}$ of the air at the inlet to the evaporator.

In another variant, the first member is a temperature probe 122 which is installed in the circuit at point B1 and which is suitable for supplying the temperature $T_{FL}$ of the refrigerant fluid in the circuit. This probe 122 is positioned in contact with the liquid part of the refrigerant fluid.

In this variant, the origin point B1 is advantageously situated in a zone of the circuit where the fluid is in a diphase state, which rules out the superheat zone of the evaporator. At the input to the evaporator, in the injection zone for the fluid, the proportion of the refrigerant fluid which is in liquid form is high, which makes this zone useful for such a measurement.

When the expansion member is of the thermostatic expander type, the temperature probe 122 (and hence the origin point B1) is situated in this injection zone for the fluid.

In air conditioning circuits which employ this type of expander, the liquid phase of the fluid is in fact quickly vaporised in the evaporator. The probe is therefore positioned at the beginning of the refrigerant fluid's journey through the evaporator and is thus situated in the phase which is as liquid as possible.

In these variant embodiments, the probe used 122 (or 22, as the case may be) has a short time constant.

The value for temperature which is supplied by the probe 122 (or 22, as the case may be) is transmitted to the electronic card (connection 30), which applies the law governing the saturation of fluids to deduce therefrom the value of the pressure $P_1$ of the fluid. The equation in appendix A1.1 represents the law governing the saturation of fluids which relates the pressure $P_1$ to the temperature $T_{FL}$ supplied by the probe 22.

The equation in appendix A1.2 represents the law governing the saturation of fluids which relates the pressure $P_1$ to the temperature $T_{air}$ supplied by the probe 22. The electronic card also receives the value of the temperature $T_{ae}$ of the air which is blown in downstream of the evaporator, which value is supplied by the passenger-compartment regulator 41, and the value $\eta_{ev}$ of efficiency of the evaporator, to allow the pressure $P_1$ to be calculated. The efficiency value is a heat-exchange efficiency. This value applies in this case solely to the zone of the evaporator where the probe is used.

The electronic card receives the value measured by probe 122 (or 22 as the case may be) via the connection 30 and calculates the value of the origin pressure $P_1$ by applying the equation in appendix A1.1 (or A1.2 as the case may be).

As a variant, the origin pressure $P_1$ may be measured directly by a sensor 222 which is positioned at point B1, for example at the inlet to the evaporator 13. This measurement is transmitted to the electronic card 401, via the connection 30.

The following steps produce an estimate of the suction pressure $P_2$ of the compressor at point B2.

According to another feature of the invention, the air conditioning circuit comprises a second measuring member suitable for supplying a value relating to the suction pressure $P_2$.

In a variant embodiment, the compressor in the air conditioning circuit is a variable displacement compressor fitted with a control valve. The suction pressure $P_2$ of a variable displacement compressor is related to the value of the current $I_v$ to the control valve of the compressor. Hence, from the value of this current, it is possible to estimate the pressure $P_2$ at point B2.

In this embodiment, the second measuring member is suitable for determining the instantaneous value of the current $I_v$ to the control valve of the compressor and for transmitting this value to the electronic card. The electronic card 401 then estimates the value of the ingoing pressure $P_2$ from the value so obtained for the current $I_v$.

Figure 4:
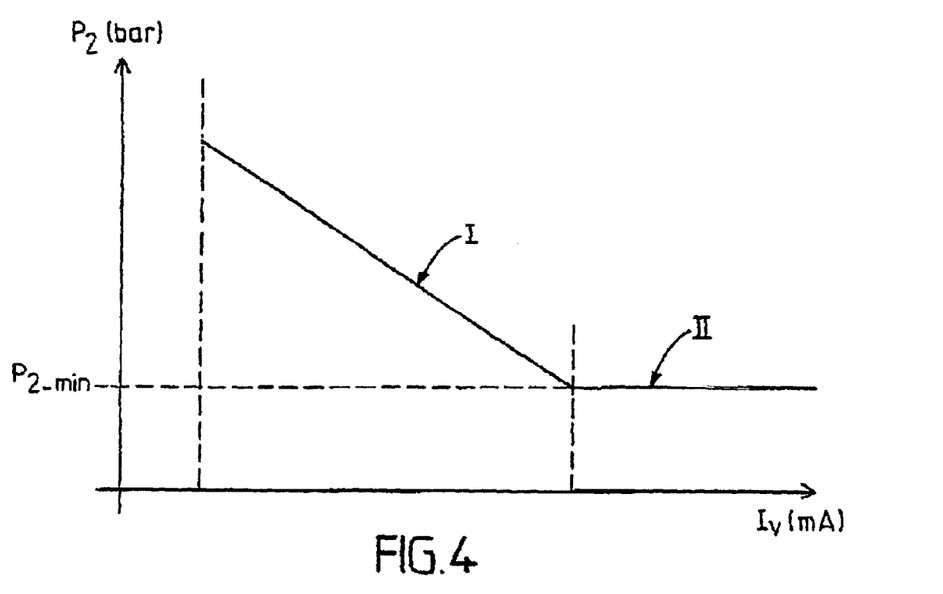
FIG. 4 is a graph showing the regulating curve for an externally controlled compressor.

FIG. 4 shows an example of a curve relating the suction pressure $P_2$ of a compressor to the current $I_v$. This curve was plotted for an externally controlled compressor. The equation corresponding to part I of the curve is given in appendix A2. For as long as the compressor has not reached its maximum displacement, the suction pressure $P_2$ varies as a function of $I_v$ (part I of the curve). When however the compressor reaches its maximum displacement (part II of the curve), the suction pressure $P_2$ of the compressor reaches a constant value $P_{2\_min}$. The equation in appendix A2 no longer applies.

The estimation of the suction pressure $P_2$ of the compressor from the measurement of the current $I_v$ to the control valve may thus be performed by determining whether the compressor is at maximum displacement, that is to say by determining whether the instantaneous value of the suction pressure $P_2$ on the fluid is equal to or less than $P_{2\_min}$.

For this purpose, the electronic card makes an initial estimate $P_{2\_init}$ of the suction pressure of the compressor from the current $I_v$ to the control valve and determines whether the compressor is at maximum displacement. Where appropriate, the electronic card 401 adjusts the initial estimate of the suction pressure $P_{2\_init}$, which gives the final estimate $P_2$ of this pressure.

The estimate of the suction pressure $P_2$ is made in steps 102, 104, 106, 108, 110 and 112 in this embodiment.

In step 102, the instantaneous value $I_v$ of the current to the control valve is measured by the second measuring member. This measuring member is a sensor which may be connected to any computer of the vehicle.

In step 104, the electronic card makes use of the equation which relates the pressure $P_2$ to the current $I_v$ to the control valve, such as the equation in appendix A2.1 for example, to calculate an initial estimate of the suction pressure $P_{2\_init}$ of the compressor from the measured value of the current $I_v$.

Advantageously, the electronic card uses the equation in appendix A3 which relates the fluid flow rate in the air conditioning circuit to a difference in pressure between points B1 and B2 to determine whether the compressor is at maximum displacement.

For this purpose, in step 106, the electronic card calculates an estimate of the suction pressure $P_{2\_min}$ when the compressor is at maximum displacement from the equation in appendix A3.

This is because the equation in appendix A3 gives the flow rate m of refrigerant fluid as a function of the origin pressure $P_1$ and the suction pressure $P_2$.

Also, the flow rate m of refrigerant fluid is related to the displacement $C_y$ of the compressor, to the high pressure $P_d$, to the suction pressure $P_2$ and to the speed of rotation N of the compressor by the equation in appendix A5.

Identifying the equation in appendix A3 with the equation in appendix A5 gives the equation in appendix A6 which relates the suction pressure $P_2$ to the high pressure $P_d$, to the origin pressure $P_1$, to the speed of rotation N of the compressor and to the displacement $C_y$ of the compressor.

The value of the displacement $C_y$ of the compressor at maximum displacement is known. The electronic card is therefore able to calculate the suction pressure $P_{2\_min}$ on the fluid for a compressor at maximum displacement from the above equation. The value of the speed of rotation N of the compressor is supplied to the card by the injection computer 42 via connection 33. The system may comprise a pressure sensor 25 or a temperature sensor 125 to estimate the high pressure $P_d$. Sensors of this kind are generally present in air conditioning circuits. What is more, the origin pressure $P_1$ was estimated in step 100.

In step 108, the electronic card compares the initial estimate $P_{2\_init}$ of the suction pressure $P_2$ of the compressor, which was obtained in step 104, with the value of the suction pressure $P_{2\_min}$ of the compressor at maximum displacement, which was obtained in step 106 and, in step 110 or 112, gives a final estimate of the suction pressure $P_2$ as a function of the result of the comparison.

Figure 5:
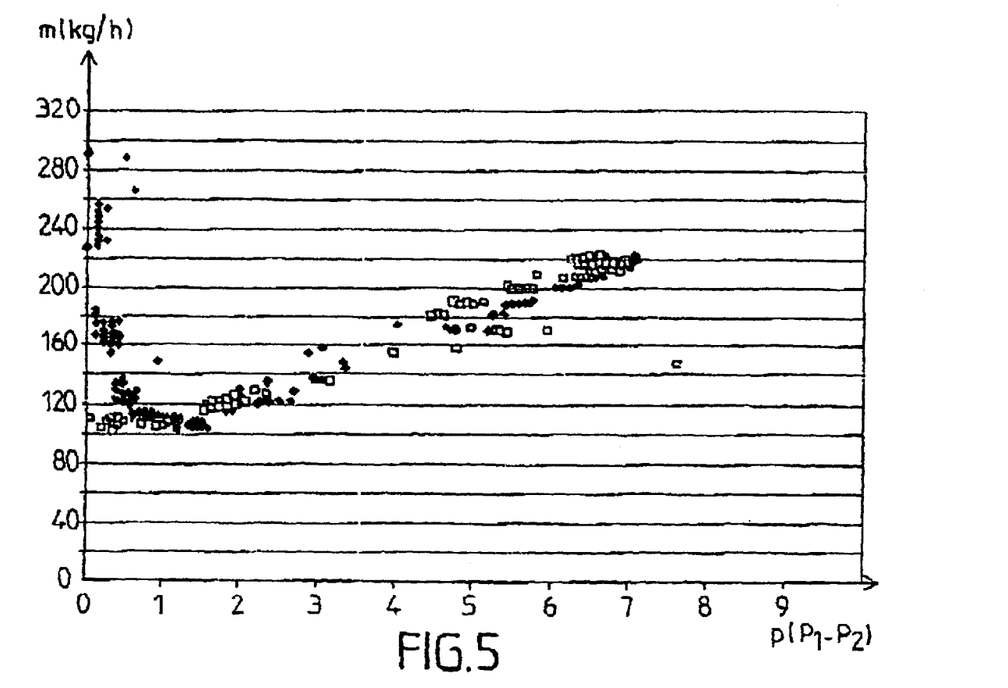
FIG. 5 illustrates the accuracy of the estimation according to the invention.

To be more exact, and by reference to FIG. 5, if the initial estimate $P_{2\_init}$ of the suction pressure of the compressor is equal to or less than the value of the suction pressure $P_{2\_min}$ of the compressor at maximum displacement, the compressor is at maximum displacement and consequently the value of the suction pressure $P_2$ corresponds to the value of the suction pressure $P_{2\_min}$ of the compressor at maximum displacement.

If it is not, the value of the suction pressure $P_2$ corresponds to the initial estimate $P_{2\_init}$ of the suction pressure of the compressor which was obtained in step 104.

In a variant embodiment, in which a fixed displacement compressor is used, the suction pressure $P_2$ is estimated from the equation in appendix. This is because, since the displacement $C_y$ of a fixed displacement compressor is known, the electronic card is able to solve the equation in appendix A6, to give the value of the suction pressure $P_2$, of the value of the speed of rotation N of the compressor supplied by the injection computer 42 and of the value of the high pressure $P_d$ which is supplied by the sensor 25 (or 125 as the case may be).

Other variant embodiments allow the suction pressure $P_2$ to be estimated for any type of compressor.

Hence, referring to FIG. 2, the second measuring member may be a pressure sensor 23, positioned at point B2, which is suitable for supplying the instantaneous value of the suction pressure $P_2$ of the compressor. This measurement is transmitted to the electronic card 401 via connection 30.

In step 114, the electronic card makes use of the equation in appendix A3 and uses the estimated values for the origin pressure $P_1$ and the suction pressure $P_2$ to calculate a magnitude relating to the refrigerant fluid.

In the first embodiment according to the invention, the electronic card 401 solves the equation in appendix A3 to calculate an estimate of the flow rate m of refrigerant fluid in the air conditioning circuit. The pressure loss $(P_1-P_2)$ is calculated from the values estimated for the pressures $P_1$ and $P_2$ in the course of the previous steps. S is a constant relating to the air conditioning circuit. The coefficient ρ represents the charge density of the fluid used, that of the R134a fluid for example. The coefficient K is obtained as a function of the charge density ρ selected for calculation.

This charge density ρ may be calculated from the origin pressure $P_1$ by the equation in appendix A4.1, or from the suction pressure $P_2$ by the equation in appendix A4.2, or again from a mean of these two pressures. Appendix A4.3 contains an example of an equation which gives the charge density ρ for the subcritical refrigerant fluid R134a. However, as indicated above, the invention is not limited to an air conditioning circuit which operates with a subcritical refrigerant fluid. Hence, appendix A4.4 gives an example of an equation which gives the charge density ρ for the supercritical refrigerant fluid CO2 (R744).

Estimating the flow rate m of refrigerant fluid is particularly useful in air conditioning circuits. It particular, it enables an estimate of the power $P_a$ drawn by the compressor to be calculated.

The power $P_a$ drawn by the compressor may in fact be estimated from the mass flow rate m of refrigerant fluid which is obtained in the first embodiment, for example from the equation provided by appendix A7. The electronic card 401 solves this equation from the value for the flow rate m of the refrigerant fluid which is estimated in accordance with the invention, from the value of the speed of rotation N of the compressor which is supplied by the injection computer 42, from the value of the suction pressure $P_2$ estimated previously and from the value of the high pressure $P_d$ which is supplied by the sensor 25 (or 125, as the case may be). The constants C and D are related to operating parameters of the air conditioning circuit and, in their capacity as calculation parameters, are thus fixed.

The computer then conveys to the injection module of the engine the estimated value of the mechanical power $P_a$ drawn by the compressor, and adjusts the nominal power drawn by the compressor if the latter exceeds a maximum value which is defined by the computer from this estimated value. Consequently, fuel consumption is reduced and any excessive increases in the power drawn by the compressor are better controlled.

FIG. 4 shows the accuracy of the estimate of the flow rate m of refrigerant fluid in this embodiment for the subcritical refrigerant fluid R134a. The Figure is a graph representing the value of the refrigerant fluid flow rate m (along the y axis) as a function of the values of the difference $[\rho*(P_1-P_2)]$ (along the x axis).

The tests were carried out for the refrigerant fluid R134a, for which $\rho=2.4326*P_2+0.2203$ and $\eta_{ev}=0.9$, under the following conditions:
  outside temperature of 25° C., relative humidity of 40%, speed of pulser 83 g/s, speed of rotation N=2000 rpm.
  outside temperature of 45° C., relative humidity of 40%, speed of pulser from 111 to 138 g/s, speed of rotation N=2000 rpm.

The origin point B1 was situated at the outlet of the evaporator. The square dots were obtained for a suction pressure $P_2$ which was measured, and an origin pressure $P_1$ which was estimated, from the probe for measuring air temperature. The diamond-shaped dots were obtained for a measured pressure $P_1$ and a measured pressure $P_2$.

In a second embodiment of the invention, the system according to the invention is used to obtain an estimate of the suction pressure $P_2$ on the refrigerant fluid.

In this second embodiment, the electronic card 401 makes use of the solution of the equation in appendix A3 to calculate an estimate of the suction pressure $P_2$ on the refrigerant fluid, when the vehicle is already fitted with a known arrangement for estimating the flow rate of the refrigerant fluid. An example of an arrangement of this kind is described in French patent application No. 01 16568. In this arrangement, the cooling member is a condenser, which enables a subcritical refrigerant fluid such as R134 refrigerant fluid to be used. This arrangement comprises measuring members which enable values relating to the temperature $T_{aek}$ of the flow of outside air at the inlet to the condenser, and to the pressure $P_d$ of the refrigerant fluid at the delivery of the compressor to be established. The electronic card then makes use of the equation in appendix A1 to calculate an estimate of the refrigerant fluid flow rate m in the air conditioning circuit from the values of the temperature $T_{aek}$ of the flow of outside air blown in at the inlet to the condenser, and of the pressure $P_d$ of the refrigerant fluid at the delivery of the compressor.

Solving the equation in appendix A3 in order to calculate an estimate of the suction pressure $P_2$ on the refrigerant fluid also calls for an estimate of the origin pressure $P_1$ and of the charge density ρ of the fluid. The value of the origin pressure $P_1$ is supplied by step 100. The charge density ρ of the fluid may be estimated from $P_1$ by using appendix A4.1.

Other arrangements for estimating the refrigerant fluid which operate for any type of refrigerant fluid and for any type of cooling member may be used. The arrangement in patent JP 2001-73941 for example is able to operate with an air conditioning circuit in which the cooling member is an external cooler ("gas cooler") and the refrigerant fluid is the supercritical fluid CO2 (R744).

This estimate $P_2$ can be used to calculate the power consumed by the compressor and also to ensure that it operates well. It may also be used to check or validate a value for the suction pressure which is obtained by other means, such as that which is obtained for example by using the current to the valve of the compressor in steps 102 and 104.

In a third embodiment according to the invention, the electronic card 401 solves the equation in appendix A3 to detect the maximum displacement of a variable displacement compressor. The first embodiment of the invention makes use of this detection of the maximum displacement but detection of the displacement of the compressor may be used in other applications. For example, in the context of regulating/checking the cold loop, such detection is employed to stop the control of the compressor and thus to optimise the regulation of the temperature of the blown air. This embodiment was described by reference to steps 102, 104, 106, 108, 110 and 112 in FIG. 3.

The present invention is also directed to a logic code which it calls into operation, particularly when the code is made available on any medium which can be read on a computer. The expression "computer-readable medium" covers a storage medium, magnetic or optical for example, and also a means of transmission, such as a digital or analog signal.

Appendix A

A1. Estimating the origin pressure

A1.1 - Refrigerant fluid temperature probe

$P_1 = Psat[T_{FL}]$

A1.2 - Air temperature probe

$P_1 = Psat\,[(T_{air} - (1 - \eta_{ev}) * T_{ae}/\eta_{ev}]$ A2. Estimating the suction pressure of an externally controlled compressor for $P_2 > P_2\,max$     $P_2 = a \cdot k \cdot Iv^2 + b \cdot Iv + c$ A3. Equation relating the refrigerant fluid flow rate m to the pressure loss $\Delta P$ on the low-pressure line     $m = root\,[(2 \cdot \rho \cdot S^2 \cdot \Delta P)/K$     $\Delta P = P_1 - P_2$ A4. Estimating the fluid density $\rho$ (in kg/m³)

A4.1 - Estimating the fluid density $\rho$ from $P_1$

$\rho(P_1) = k1 \cdot P_1 + k2$, where k1 and k2 are constants     A4.1 - Estimating the fluid density $\rho$ from $P_2$     $\rho(P_2) = k1' \cdot P_{su} + k2'$, where k1' and k2' are constants     A4.3 - Example of estimating the fluid density $\rho$ from P1 for the subcritical fluid R134a     $\rho(P_1) = 2.4326 \cdot P_1 + 0.2203$     A4.4 - Example of estimating the fluid density $\rho$ from P1 for the supercritical fluid $CO_2$     $\rho(P_1) = 3.6814 \cdot P_1 - 30.6$ A5 - Estimating the refrigerant fluid flow rate for an externally controlled compressor $m = N \cdot C_y \cdot \rho(P_2) \cdot [k3(N) \cdot (P_d/P_2) + k4(N)]$ A6 - Estimating the inlet pressure $P_2$ as a function of the displacement $C_y$ of the externally controlled compressor $f_4(N, C_y) \cdot P_2^4 + f_3(P_d, P_1, C_y) \cdot P_2^3 + f_2(P_d, P_1, N, C_y) \cdot P_2^2 + f_1(P_d) \cdot P_2 + f_0(P_d) = 0$ A7 - Estimating the power $P_a$ drawn by the compressor $P_a = C \cdot m \cdot (Pr^{(k-1)/k} - 1) + D \cdot N$ where $Pr = P_d/P_2$

What is claimed is:

1. Air conditioning system for motor vehicles which is fitted with an injection computer and with a refrigerant fluid circuit comprising a compressor, a cooling member, an expansion member and an evaporator, together with an electronic control device intended to interact with the refrigerant fluid circuit and the injection computer, and which comprises:

a first measuring member suitable for supplying a value relating to the fluid pressure at a first point in the air conditioning circuit, termed the first pressure, said first point being situated between the outlet of the expansion member and the outlet of the evaporator, a second measuring member suitable for supplying a value relating to the fluid pressure at a second point in the air conditioning circuit, termed the second pressure, said second point being situated at the inlet to the compressor, and wherein the electronic control device is able to make use of the solution of an equation which relates the mass flow rate of the refrigerant fluid to the difference in pressure between the first point and the second point in order to calculate an estimate of a magnitude relating to the refrigerant fluid.

2. Air conditioning system according to claim 1, wherein the magnitude relating to the refrigerant fluid is the mass flow rate f refrigerant fluid, and the electronic control device is able to solve the said equation from the value of the first pressure and the value of the second pressure.

3. Air conditioning system according to claim 1, wherein the magnitude relating to the refrigerant fluid is the second pressure and the electronic control device is able to solve the said equation from the value of the mass flow rate of the fluid and the value of the first pressure.

4. Air conditioning system according to claim 3, wherein the cooling member is a condenser and the system comprises measuring members suitable for supplying a value relating to the temperature of the flow of outside air at the inlet to the condenser and a value relating to the pressure of the fluid at the delivery of the compressor, termed the high pressure, the electronic control device being able to use the values supplied by said measuring members to make use of the solution of an equation which relates the mass flow rate of the refrigerant fluid to the temperature of the flow of outside air at the inlet to the condenser and to the high pressure in order to calculate an estimate of the instantaneous value of the mass flow rate of the refrigerant fluid.

5. Air conditioning system according to claim 3, wherein the value of the speed of rotation of the compressor is supplied to the electronic control device by the injection computer.

6. Air conditioning system according to claim 1, wherein the compressor is of variable displacement and the magnitude relating to the refrigerant fluid is the minimum value of the pressure of the fluid corresponding to the maximum displacement of the compressor, the electronic control device being able to solve the said equation from the value of the first pressure and the value of the speed of rotation of the compressor.

7. System according to claim 1, wherein the compressor is fitted with a control valve and the second measuring member is a sensor suitable for supplying the instantaneous value of the current to the control valve, the electronic control device being able to calculate an initial estimate of the second pressure from the value of the current to the control valve of the compressor which is supplied by the second measuring member.

8. Air conditioning system according to claim 7, wherein the compressor is of variable displacement and the magnitude relating to the refrigerant fluid is the minimum value of the pressure of the fluid corresponding to the maximum displacement of the compressor, the electronic control device being able to solve the said equation from the value of the first pressure and the value of the speed of rotation of the compressor, and wherein the electronic control device is able to compare the initial estimate of the second pressure with the minimum value of the second pressure.

9. Air conditioning system according to claim 8, wherein the electronic control device is able to react to the fact that the initial estimate of the second pressure is equal to or less than the minimum value of the second pressure by supplying a final estimate of the second pressure which is substantially equal to the minimum value of the second pressure.

10. Air conditioning system according to claim 8, wherein the electronic control device is able to react to the fact that the second pressure is higher than the minimum value of the second pressure by supplying a final estimate of the second pressure which is substantially equal to the initial estimate of the second pressure.

11. Air conditioning system according to claim 1, wherein the second member is a sensor which is positioned at the second point and which is able to supply the instantaneous value of the second pressure.

12. Air conditioning system according claim 1, wherein the first measuring member is a sensor which is positioned at the first point and which is suitable for supplying the instantaneous value of the first pressure directly.

13. Air conditioning system according to claim 1, wherein the first measuring member is a temperature probe which is positioned in the fins of the evaporator and which is suitable for supplying a measurement of the instantaneous value of the temperature of the air in the evaporator.

14. Air conditioning system according to claim 13 in which the expansion member is a thermostatic expander, wherein the temperature probe is positioned in the zone where fluid is injected into the evaporator.

15. Air conditioning system according to claim 13, wherein the electronic control device is able to estimate the value of the first pressure from the value supplied by the temperature probe.

16. Air conditioning system according claim 13, wherein the temperature probe has a time constant equal to or less then 5 seconds.

17. Air conditioning system according to claim 1, wherein the first measuring member is a temperature probe which is positioned downstream of the evaporator and which is suitable for supplying a measurement of the instantaneous value of the temperature of the air entering the evaporator.

18. Air conditioning system according to claim 1, wherein the first measuring member is a temperature probe which is suitable for supplying the instantaneous value of the temperature of the fluid, the probe being positioned at the first point, in contact with the liquid part of the fluid.

19. Air conditioning system according to claim 18, wherein the first point is situated at a location in the air conditioning circuit at which the refrigerant fluid is in a diphase state.

* * * * *